Figure 1:
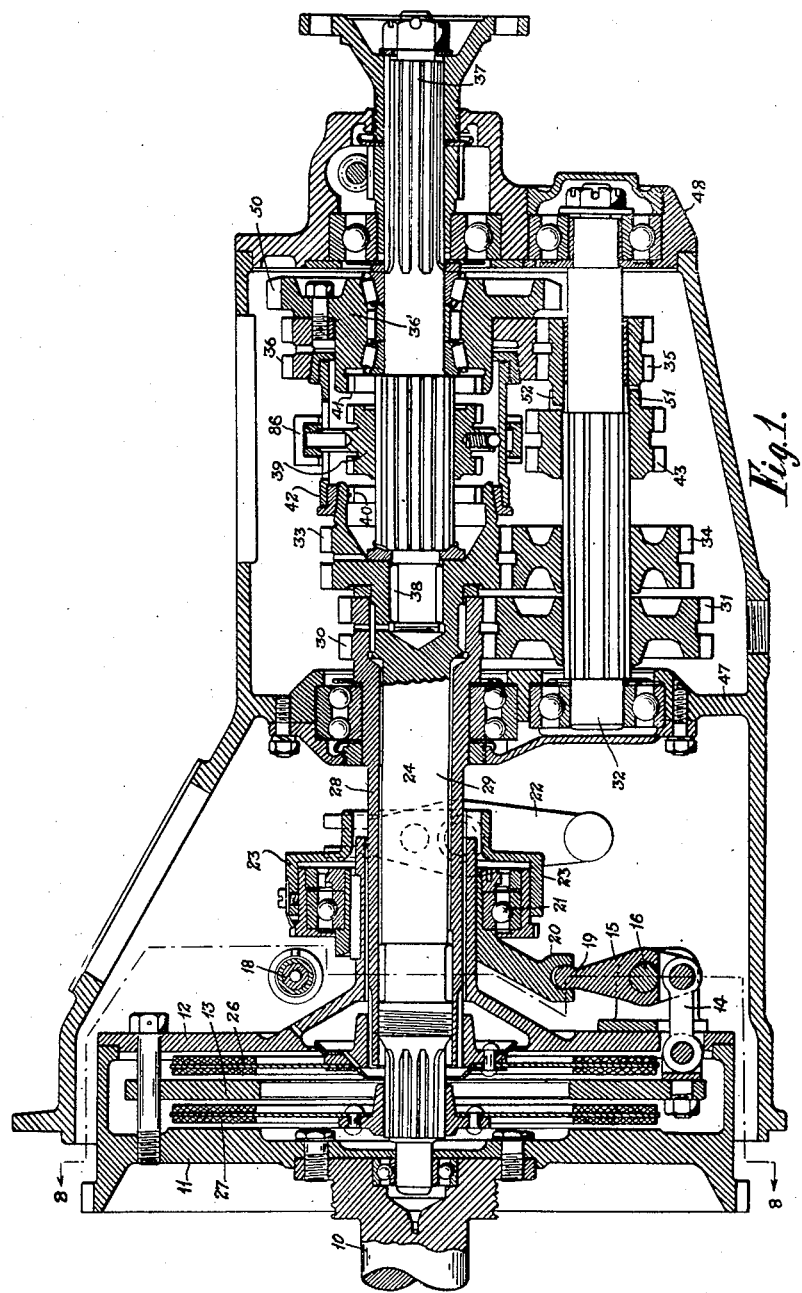

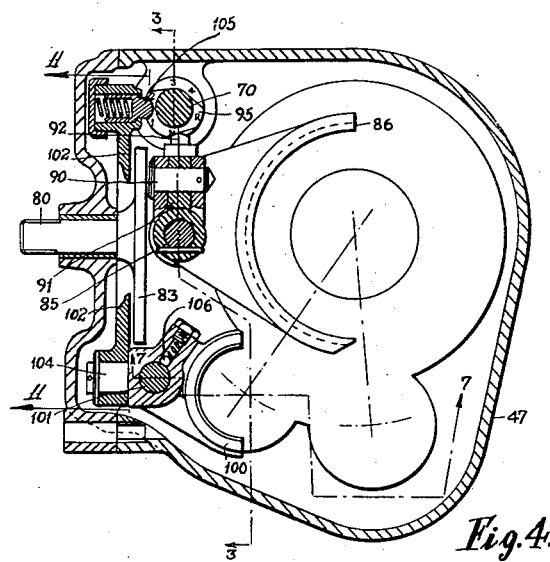
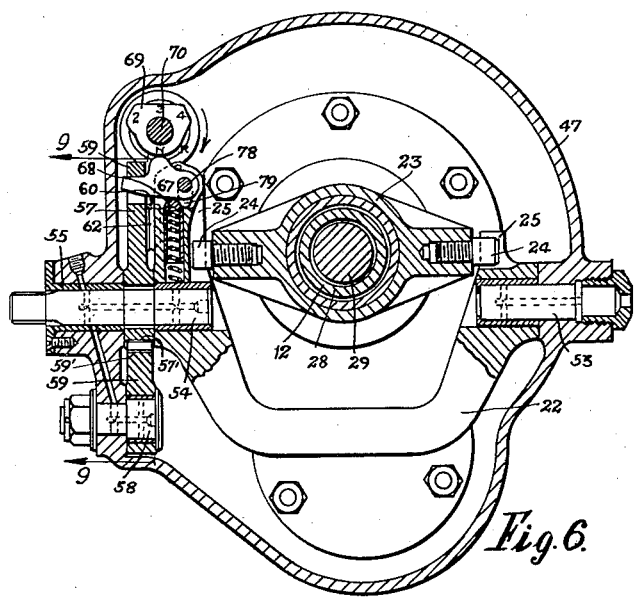

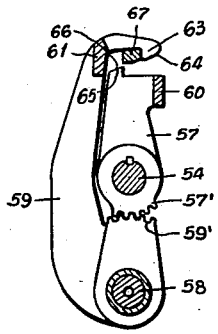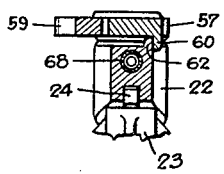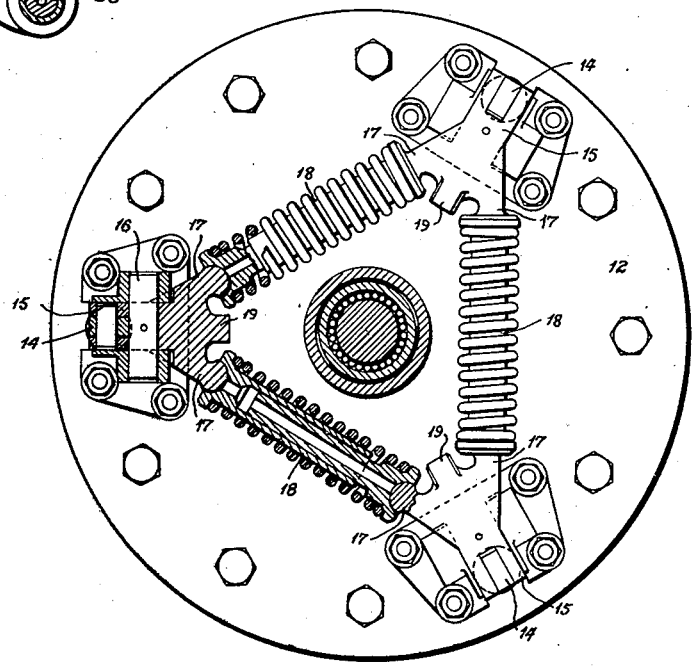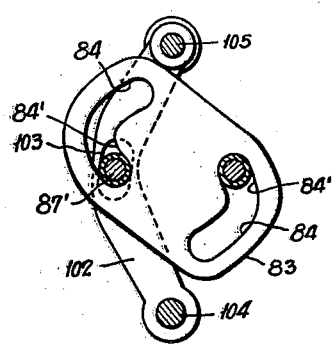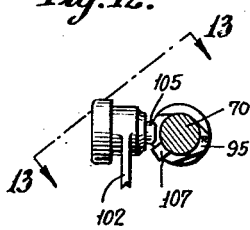

Patented Nov. 16, 1937

2,099,141

UNITED STATES PATENT OFFICE 2,099,141

PRESELECTIVE CHANGE-SPEED GEARING

Reid Antony Railton, Byfleet, England, and Achille Charles Sampietro, Genoa, Italy, assignors to Robot Gearing Limited, London, England, a company of Great Britain Application June 28, 1935, Serial No. 28,810
In Great Britain July 5, 1934

17 Claims. (Cl. 74—334)

The present invention relates to change-speed gearing of the kind in which the desired speed ratio can be preselected by operation of a preselector control, and thereafter engaged by the operation of a second gear-changing control, for example by depression of a pedal.

An object of the present invention is to provide a gearing of this kind which is light and compact, and nevertheless reliable and comparatively inexpensive.

According to the present invention in one aspect, the improved preselective change-speed gearing includes two clutches which are so arranged that power can be transmitted through them in series and which are operated for the purpose of selecting a gear, one of these clutches being of the friction type and the other of the jaw type. The gearing also includes gear-changing means having a gear-changing control member, connected with the actuating members of the gear-selecting clutches by disengageable connections, a preselector control for engaging and disengaging these connections, and means for preventing engagement of the friction clutch until the jaw clutch is engaged. Consequently, since during gear-changing the friction clutch cannot be engaged while the jaw clutch is being actuated, the jaw clutch is moved into engagement invariably in an unloaded condition, the reconnection of the drive being effected by the friction clutch, whereby risk of shocks is avoided.

Further objects of the invention are to provide improved clutch-actuating means including the connections therefrom to the preselector and gear-changing control members; also a convenient arrangement for providing a reverse motion of the output shaft of the improved gearing.

The preferred constructional form of gearing according to this invention comprises a rotary driving member, a rotary intermediate member, a rotary output member, two friction clutches each having a driving part and a driven part, said driving parts being both directly connected to said driving member and said driven parts being connected respectively by gear trains of different ratios with said intermediate member, two jaw clutches each having a driving part and a driven part, said jaw-clutch driven parts being both connected to said output member and said jaw-clutch driving parts being connected respectively to one of said friction clutch driven parts and to said intermediate member, means for actuating said friction clutches, means for actuating said jaw clutches, common gear-changing control mechanism operatively connected with said clutch-actuating means and comprising means for delaying engagement of either of said friction clutches until either of said jaw-clutches is engaged. The jaw clutches are preferably provided with auxiliary synchronizing friction clutches of the so-called "synchromesh" type. The auxiliary synchronizing clutches may be dispensed with where an isolating clutch, such as a free-wheel drive, is provided between the gearing and the driven shaft of the power-transmission system.

The invention will be further described with reference to the accompanying drawings of an improved change-speed gearing suitable for use on a road motor vehicle. In the drawings Fig. 1 is a sectional elevation of the gearing, as viewed from the near side (i. e. the left-hand side when the mechanism is seen from the output shaft end), the control mechanism being omitted.

Figure 2:
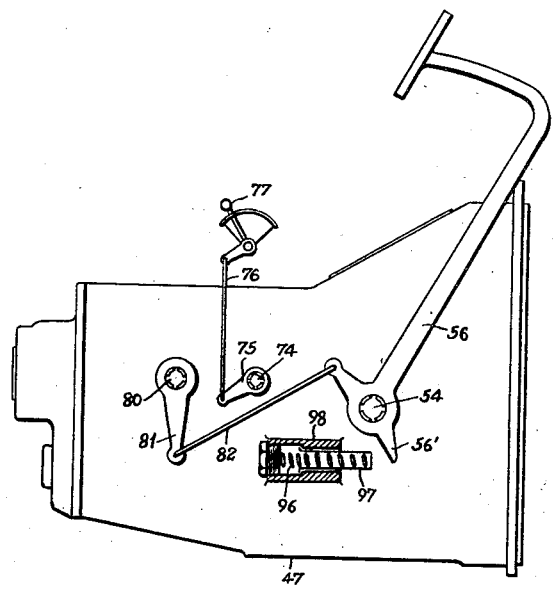
Figure 7:
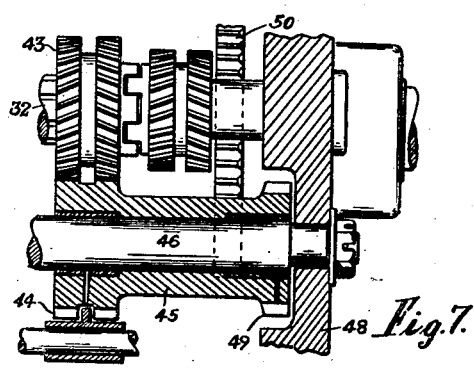
Figure 3:
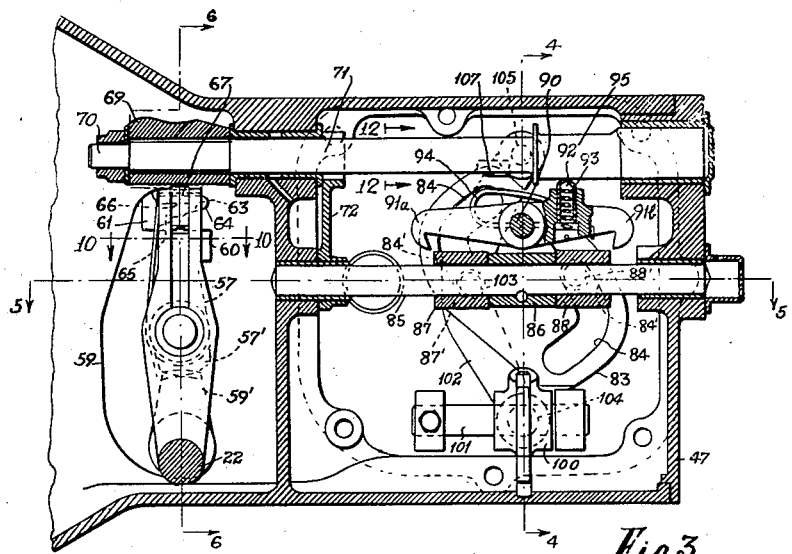
Figure 5:
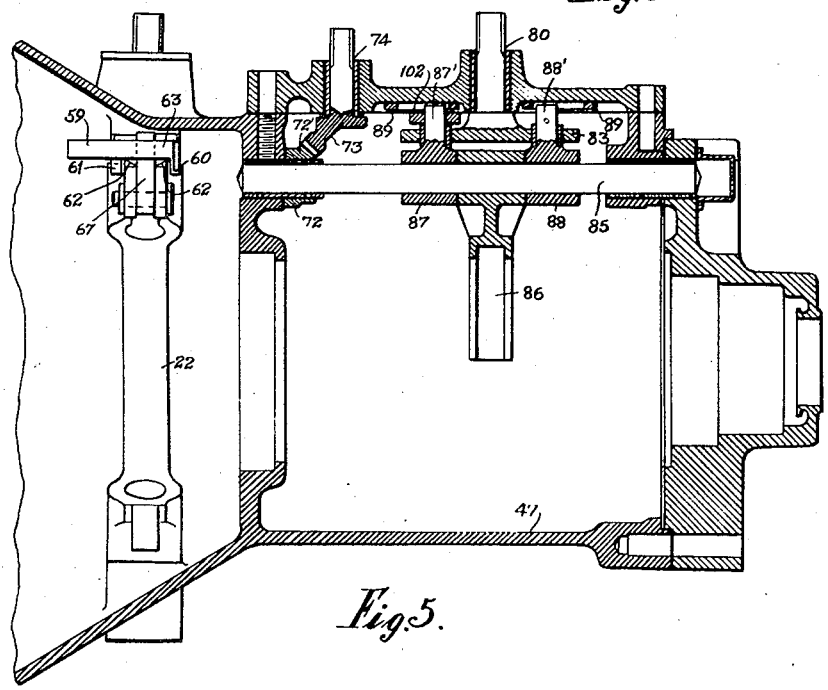

Fig. 2 is an elevation of the off side of the gearing (i. e. the opposite side to that seen in Fig. 1), Figs. 3, 4, 5 and 6 show the control mechanism in position in the gear casing, Fig. 3 is a sectional side elevation on the line 3—3 in Fig. 4, Fig. 4 is a sectional end elevation on the line 4—4 in Fig. 3, Fig. 5 is a sectional plan on the line 5—5 in Fig. 3, Fig. 6 is a sectional end elevation on the line 6—6 in Fig. 3, Fig. 7 is a sectional plan, viewed from below, of a detail, on the line 7—7 of Fig. 4, Fig. 8 is a sectional end elevation on the line 8—8 in Fig. 1, Fig. 9 is a sectional elevation of a detail, taken on the line 9—9 in Fig. 6, Fig. 10 is a sectional plan of a detail, taken on the line 10—10 in Fig. 3, Fig. 11 is a sectional elevation of a detail, taken on the line 11—11 in Fig. 4, Fig. 12 is a sectional end elevation of a detail, taken on the line 12—12 in Fig. 3, and Fig. 13 is an oblique elevation of a detail viewed in the direction 13—13 in Fig. 12.

Referring to Fig. 1, to the driving shaft 10 of the transmission system, for instance the engine crankshaft, is fixed the driving part of a friction clutch having two independently engageable driven elements. This clutch may be of the known toggle operated type, having three driving plates and two driven plates placed respectively between the front and middle and middle and rear driving plates. The front and rear driving plates, which may be formed by a hollow flywheel 11 and a cover plate 12, are in fixed relationship, while the middle plate 13 is displaceable axially so as to be capable of engaging the driven plates 26 and 27 alternatively. The middle plate 13 is connected at its periphery by a plurality of uniformly-spaced links 14, to the outer ends of a corresponding number of radial levers 15 (Fig. 8) pivotally mounted at 16 on the back of the cover plate 12.

The radially inner ends of the levers 15 have three prongs, the outer, 17, of which terminate in hemispherical heads. Between the adjacent hemispherical heads of each pair of neighbouring levers 15 is placed a telescopic compression spring link 18, so arranged that, when the spring links and levers are on dead centre, both driven plates are disengaged. The middle prongs 19 of the levers 15 are connected to a clutch-actuating spider 20 which is connected in turn, through a bi-directional thrust bearing 21 to a member 23 having two diametrically opposed radial pins 24 (Fig. 6) engaged in recesses 25 in a yoke 22 capable of rocking about a transverse axis lying below the clutch axis. If this yoke is rocked forward, (anti-clockwise in Fig. 1) it moves the spider 20 forward and consequently effects engagement of the rear driven clutch plate 26, the toggle springs serving to keep this plate nipped between the middle and rear driving plates; similarly, if the yoke is rocked to the rear, the front driven clutch plate 27 is engaged.

The clutch driven plates are mounted respectively on two co-axial input shafts 28 and 29. The rear end of the outer input shaft 28, which carries the rear driven clutch plate 26, is integral with a small input pinion 30 in constant mesh with a gear wheel 31 splined to a counter-shaft 32. The rear end of the inner input shaft 29, which carries the front driven clutch plate 27, is integral with a larger input pinion 33, in constant mesh with a gear wheel 34 splined to the counter-shaft 32.

On the rear end of the counter-shaft 32 is journalled a pinion 35 in constant mesh with a gear wheel 36 attached by screws to a hub portion 36' journalled on an output shaft 37 co-axial with the input shafts, and having its front end supported from the inner input shaft 29 by a spigot bearing 38. The part of the output shaft 37 between the larger input pinion 33 and the output gear wheel 36 is splined and carries an internally-splined slidable double-ended jaw-clutch member 39 which is adapted to engage alternatively with teeth 40 on the larger input pinion 33 and with teeth 41 on the hub 36' of the output gear wheel 36. These jaw clutches 39, 40 and 39, 41 are provided with balking and synchronizing devices, which in the construction shown are of a known "synchromesh" type in which the slidable clutch element 39 carries a sleeve 42 having a conical surface at each end adapted to co-operate with corresponding conical elements attached to the non-slidable elements of the jaw clutches. The design and mode of operation of such synchromesh clutches are well known, and therefore do not require further description here.

An internally splined pinion 43 is slidably mounted on a splined part of the counter-shaft 32, and this pinion is in constant mesh with a gear wheel 44 (Fig. 7) fixed to a hollow reverse idler shaft 45 slidable axially of a shaft 46 fixed in the gear casing 47 at its forward end and in a rear cover 48 at its rear end. All the gear wheels and pinions so far described are of the double-helical type. At the rear end of the reverse shaft 45 is a straight-tooth pinion 49 adapted to mesh with a reverse gear wheel 50 formed on the hub 36' of the output gear wheel 36 and disposed behind that wheel. The slidable pinion 43 on the counter-shaft 32 is provided with jaw-clutch teeth 51 which, during forward running, are engaged with teeth 52 on the pinion 35. To engage reverse, the idler shaft 45 is moved forward, in a manner to be hereinafter described. Since the gear wheels 43 and 44 are double-helical, the shaft 45, when slid, draws with it the wheel 43 so that the jaw-clutch teeth 51 and 52 are disengaged while the straight-tooth gear wheels 49 and 50 are slid into mesh.

The ratios of the gear trains are such that four forward speeds are obtainable, as follows. Top (direct) drive—the front main friction clutch driven plate 27 engaged, and the synchromesh clutch member 39 engaged with the teeth 40 on the larger input pinion 33; the drive passes through the inner input shaft 29 directly to the output shaft 37. Third gear—the rear main driven plate 26 and the synchromesh clutch 39, 40 engaged; the drive passes through the outer input shaft 28, the smaller input pinion 30, the counter-shaft wheels 31 and 34, the larger input pinion 33, the synchromesh clutch 39, 40 and the output shaft. Second gear—the front main driven plate 27 engaged, and the synchromesh clutch member 39 engaged with the teeth 41 on the hub 36' of the output gear wheel 36; the drive passes through inner input shaft 29, the larger input pinion 33, the counter-shaft wheel 34, the counter-shaft rear pinion 35 by way of the jaw clutch teeth 51, 52, the output gear wheel 36, the synchromesh clutch 39, 41 and the output shaft 37. First gear—the rear main driven plate 26 and the synchromesh clutch 39, 41 engaged; the drive passes through the outer input shaft 28, the smaller input pinion 30, the counter-shaft wheel 31, and thence as on second gear. Reverse—the rear main driven plate 26 and the synchromesh clutch 39, 41 engaged, the reverse shaft 45 moved forward; the drive passes through the smaller input pinion 30, the counter-shaft wheel 31, the counter-shaft sliding pinion 43, the idler wheel 44, the reverse straight-tooth gear train 49, 50, the synchromesh clutch 39, 41 and the output shaft 37.

The control mechanism is as follows. The yoke 22 actuating the friction clutches is journalled on two pins 53 and 54 (Fig. 6) mounted in opposite sides of the bell-housing part of the casing 47. The pin 54 is journalled in the casing 47 at 55 and can be rocked by a control pedal 56 (Fig. 2). Keyed to this rocking pin 54 is a lever 57 which stands adjacent to the yoke 22. Immediately below and parallel to the rocking pin 54 is a fixed pin 58 on which is journalled a lever 59 (Figs. 3, 6 and 9) which is offset in a forward direction from the pin so that it is capable of lying parallel to and in front of the lever 57 when the two levers are vertical. The bosses of these two levers are provided with intermeshing toothed sectors 57' and 59' whereby the two levers are constrained to rock towards or away from each other simultaneously. The levers 57 and 59 are provided respectively with lateral studs 60 and 61 adapted to engage projections 62 on the yoke 22 (Figs. 5 and 9). Thus depression of the pedal 56 causes one or the other of the studs 60 and 61 (according to which clutch driven plate is engaged) to engage a projection 62 and thus move the yoke to the neutral position.

The upper end of the geared lever 59 terminates in a rearward projection which ends in a downwardly projecting tooth 63 having a front edge radial with respect to the axis of rocking of the lever and a bevelled rear edge 64 (Fig. 9). The upper end of the other geared lever 57 is provided with an upwardly projecting tooth 65 (Fig. 9) having a radial rear edge and a bevelled front edge 66. A lever 67 (Figs. 5 and 6) journalled on the yoke 22, and capable of rocking about an axis substantially parallel to the direction of motion of the teeth 63 and 65, can engage alternatively behind these two teeth, which overlap, by the thickness of the rocker 67, when the clutch pedal is fully depressed. The rocker is urged upwards by an elastic device in the form of a spring plunger 68 into contact with a cam 69 fixed to a preselector cam-shaft 70 disposed longitudinally in the upper off side part of the casing 47. This shaft is coupled, by any suitable connection system, such as a pinion 71 (Fig. 3) meshed with a spur toothed sector 72 integral with a bevel sector 72' (Fig. 5) which in turn meshes with a bevel sector 73 formed on the end of a transverse shaft 74 coupled by a crank 75 and a link 76 (Fig. 2), to a preselector control lever 77 which can be set to any of six positions yielding respectively four forward speeds, neutral and reverse. The cam 69 is so shaped as to engage the rocker 67 with one or other of the teeth 63 and 65, according to the gear preselected, and thereby cause the yoke 22 to be engaged with one or other of the geared levers 57 and 59. It is necessary to mount the rocker resiliently to enable it to ride over the bevelled edges 64 and 66 of these teeth at certain times during depression of the pedal. Consequently the rocker pivot pin 78 is mounted in eyes 79 which are elongated vertically; the part of the rocker that contacts with the cam is intermediate of the pivot pin and the free end that engages with the teeth 63 and 65; and the spring plunger 68 is housed in the yoke and bears against the under side of the rocker between the pivot and the cam contact. Thus when the rocker rides over the bevelled edge 64 of the upper tooth 63, it rocks about its pivot 78 and compresses the plunger; when it rides over the bevelled edge 66 of the lower tooth 65, it rocks about its point of contact with the cam, the pivot pin 78 moving in the slotted eyes 79 in a direction away from the cam and the plunger being compressed.

The synchromesh clutches are controlled by means similar in principle to those just described. A horizontal spindle 80 is journalled in the off side of the gear casing 47, perpendicular to the output shaft 37. To the outer end of this spindle is keyed a crank 81 (Fig. 2) which is coupled to the control pedal 56 by a link 82. To the inner end of the spindle 80 is fixed a disc 83 (Figs. 3, 4, 5 and 11) provided with two similar diametrically-opposed circumferential cam slots 84. Each slot runs at a uniform radius about the axis of the spindle 80 for a certain distance, say 40 deg. and thereafter turns spirally inwards at 84' for, say, 20 deg. Between the disc 83 and the output shaft and below the camshaft is a longitudinal bar 85 slidably mounted in the gear casing. To this bar is fixed a fork 86 which actuates the common slidable element 39 of the two synchromesh clutches. Two slide blocks 87 and 88 are slidably mounted on the bar 85, one on each side of the fork 86. The slide blocks are each provided with a bushed pin 87' and 88' engaging in one of the slots 84 in the disc 83, the outer end of each pin resting in longitudinally slotted guide members 89 fixed to the casing. The clutch-actuating fork 86 is provided with two upwardly projecting eyes between which is mounted on a transverse pin 90 a double-ended lever 91, which lies between the camshaft and the slide bar. Each end of this lever terminates in a downwardly-projecting hook 91a and 91b, which is adapted to engage behind the adjacent slide block when the block and the fork are in contact with each other. In the rear part of the lever is fitted a vertical plunger 92 urged upwards by a relatively strong spring 93 but prevented from coming more than a certain distance out of the lever. The lever is urged by a weak spring 94 in the direction in which its rear end 91b will rise; the height to which it rises being limited by an elongated cam 95 formed on the camshaft 70 and co-operating with the head of the plunger 92.

The clutch pedal 56 is provided with a return spring 96 (Fig. 2) which is housed in a plunger 97 having a limited range of movement in a housing 98 formed on the casing 47 and which comes into contact with an extension 56' of the pedal only after the pedal has been partly depressed.

In the drawings the cams 69 and 95 bear the symbols 1, 2, 3, 4, R, N, denoting the parts of the cam contour that contact with the cam follower (67 or 92) when the four forward speeds, reverse and neutral respectively are selected.

The operation of this gear on forward drives is as follows. In neutral the rear friction clutch driven plate 26 is engaged, the disconnection of the drive being effected by the synchromesh clutches. The double-ended lever 91 on the selector fork 86 is thus held by the cam 95 in the position shown in Fig. 3 in which neither of its hooks can engage with a slide block, and the selector fork remains in its neutral position. If now first gear is preselected, the cam shaft 70 is turned, and the part "1" of the cam 69 comes opposite the rocker 67 so that the latter will remain engaged behind the tooth 63 on the geared lever 59. The raised part "1" of the cam 95 depresses the plunger 92 on the lever 91, urging the rear hook 91b thereon down on to the upper surface of the slide block 88. To engage the gear the pedal 56 is fully depressed. During the first part of the pedal movement the yoke 22 is moved far enough to disengage the friction clutch, but the slotted disc 83 does not move far enough for the pins 87' and 88' on the slide blocks to pass beyond the concentric parts of the cam slots 84. As the pedal movement is completed, the friction clutch spider 20 is brought to its neutral equilibrium position, and the slide block pins pass into the spiral parts 84' of the slots in the disc 83, so that the slide blocks nip the fork 86 between them, the hook 91b engaging behind the slide block 88 owing to the action of the spring plunger 92. If the pedal 56 is now allowed to rise, the rotation of the slotted disc 83, under the influence of the pedal return spring 96, forces the slide blocks apart, and the rear slide block 88, being held in engagement with the fork 86 by the hooked lever 91, draws this fork rearwards, and urges the synchromesh clutch 39, 41 into engagement. While the pins 87' and 88' are moving through the spiral parts 84' of the cam slots, the disc 83 rotates through only 20 deg. out of its total range of movement. Consequently, although the synchromesh clutch is now fully engaged, the pedal 56 has not yet risen far enough to cause engagement of a friction clutch. As soon as the synchromesh clutch is engaged, however, the disc 83 is able to rotate further because the pins 87' and 88' have entered the concentric portions of the slots 84; the pedal 56 is now free to rise fully since the slotted disc 83 is no longer restrained from rotating by the pins 87' and 88' bearing on the spiral parts of the slots, and the yoke 22 is drawn forward by the agency of the rocker 67, which is engaged in front of the tooth 64 of the geared lever 59, until the friction clutch toggle springs take charge, engaging the rear driven clutch plate 26. There is no risk that the friction clutch will engage before the synchromesh clutch is engaged, because the yoke 22 is prevented from assuming its engaging position by the stud 61 on the lever 59, which lever cannot be displaced far enough to allow the friction clutch to engage until the synchromesh clutch is engaged.

If now, for example, top gear is preselected, the lobe "4" on the cam 69 points downwards in the path of the rocker 67, and the re-entrant part "4" of the cam 95 comes opposite the plunger 92 on the hooked lever 91 which is now urged by the light spring 94 in such a direction that its hook 91a presses against the upper surface of the slide block 87. On depression of the pedal, the friction clutch rear driven plate 26 is disengaged, as hereinbefore described, and as the rocker 67 meets the cam 69 it is depressed so that it strikes the bevelled front edge 66 of the tooth 65 on the geared lever 57; the rocker now rocks about its point of contact with the cam, sliding over the bevel, and finally engaging behind the tooth. Meanwhile, as soon as the friction clutch is disengaged, the slide block 88 is moved forward, as previously described, and centres the synchromesh clutch actuating-fork 86. The hook 91a on the lever 91 is now engaged in front of the slide block 87 by the weak spring 94, the plunger 92 being accommodated in the re-entrant part "4" of the cam 95. As the pedal is released, the slide blocks 87 and 88 move apart, the block 87 drawing with it the fork 86 and urging the synchromesh clutch 39, 40 into engagement. As the friction clutches are disengaged, the jaw clutch is rapidly synchronized and engages, permitting further rotation of the slotted disc 83 and full return of the pedal. As the synchromesh clutch engages, the yoke 22 is drawn rearwards by the agency of the rocker 67, which is now engaged behind the tooth 65 of the geared lever 57; and, after the synchromesh clutch is engaged, the toggle springs act to engage the front clutch plate 27. The stud 60 on the lever 57 (Fig. 10) prevents the yoke 22 from rocking far enough to engage the friction clutch before the synchromesh clutch 39, 40 is fully engaged.

Other gear changes between forward speeds are carried out in a similar manner, the cams 69 and 95 determining the selection of clutches to be engaged when the pedal is released. Thus any forward gear may be preselected at any time and thereafter engaged without any possibility of over-loading the synchronizing clutches, since a synchromesh clutch must be fully engaged before a main friction clutch can be engaged.

Means are provided whereby reverse gear may also be preselected. The slidable reverse sleeve 45 is controlled by a fork 100 slidably mounted on a bar 101 below and parallel to the slide bar 85 (Figs. 3 and 4). A lever 102, pivoted about a transverse pin 104 on the reverse fork 100 is provided with a slot 103 in which is engaged the pin 87' of the slide block 87. The upper end of the slotted lever 102 is provided with a transverse spring plunger 105, the head of which lies adjacent to the cam shaft 70. The reverse fork 100 is provided with a spring detent 106 which tends to hold it in one or other of its extreme positions; thus operation of the control pedal 56 on forward speeds merely causes the slotted lever 102 to rock about the pin 104 on the reverse fork 100. When reverse gear is preselected, a projection 107 on the camshaft 70 comes into the path of the plunger 105, this projection having a bevelled front edge. When the control pedal is depressed, the slotted lever 102 moves to the rear until the plunger 105 rides over the projection 107 and engages behind it. As the pedal is released, the slotted lever 102 pivots about the plunger 105, its lower end carrying forward the reverse fork 100 and engaging reverse gear. The cams 69 and 95 are so shaped as to cause engagement of the synchromesh clutch 39, 41 and the rear main driven clutch plate 26. When the preselector 77 is moved out of reverse, the projection 107 on the cam-shaft 70 moves out of the path of the plunger 105 on the slotted lever 102. If the pedal is now depressed, the slide block 87 moves to the rear, and the plunger 105 strikes the front of the cam 95, so that this lever is forced to rotate about the plunger and thus return the reverse selector fork 100 to its rear position.

It is obvious that the kind of rocking lever herein described for controlling the friction clutches can be employed also with oppositely slidable members of the cam actuated type as herein described for controlling the jaw clutches; and that the double-ended kind of rocking lever herein described for controlling the jaw clutches can be employed also with pivotally mounted oppositely-movable members.

We claim:

1. A preselective change-speed gearing having two gear-selecting clutches, a clutch-actuating element movable one side and the other of a neutral position to engage said clutches alternatively, two levers movable about parallel axis and so geared together that they are constrained to rock in opposite directions, a gear-changing control member operatively connected with said geared levers, which are disposed one on each side of said clutch-actuating element so as to be capable of moving said element to the neutral position as a result of operation of said control member in one direction, a rocking lever pivotally mounted on said clutch-actuating element and capable of engaging with said geared levers alternatively, so as to couple one or other of said geared levers to said clutch-actuating element, and preselector control means including a cam capable of actuating said rocking lever.

2. A preselective change-speed gearing having two gear-selecting clutches, a clutch-actuating element movable one side and the other of a neutral position to engage said clutches alternatively, two slidable members, gear-changing control means comprising a cam which serves to move said slidable members simultaneously apart or towards each other, said slidable members being disposed one on each side of said clutch-actuating element so as to be capable of moving said element to the neutral position as a result of operation of said control member in one direction, a rocking lever pivotally mounted on said clutch-actuating element and capable of engaging with said slidable members alternatively, so as to couple one or other of said slidable members to said clutch-actuating element, and preselector control means including a cam capable of actuating said rocking lever.

3. A preselective change-speed gearing having two gear-selecting clutches, a clutch-actuating element movable one side and the other of a neutral position to engage said clutches alternatively, a gear-changing control member, two members operatively connected together and to said control member in such a way as to be movable simultaneously towards or away from each other, the said oppositely movable members being disposed one on each side of said clutch-actuating element so as to be capable of moving the said element to the neutral position as a result of operation of said control member in one direction, preselector control means including a rotary cam, a rocking lever mounted on said clutch-actuating element by a pivot and capable of being rocked by said cam and of thereby engaging alternatively with said oppositely movable members, said rocking lever being capable of rocking about an axis substantially parallel to the direction of motion of the parts of said oppositely movable members with which it is adapted to engage, and a compression spring disposed between said rocking lever and said clutch-actuating element, acting on said rocking lever at a point intermediate of its pivot and its point of contact with said cam, the said pivot being capable of a limited displacement towards and away from said cam.

4. A preselective change-speed gearing having two gear-selecting clutches, a clutch-actuating element movable one side and the other of a neutral position to engage said clutches alternatively, a gear-changing control member, two members operatively connected together and to said control member in such a way as to be movable simultaneously towards or away from each other, the said oppositely movable members being disposed one on each side of said clutch-actuating element so as to be capable of moving the said element to the neutral position as a result of operation of said control member in one direction, preselector control means including a cam rotatable about an axis parallel to the direction of movement of said clutch-actuating element, the length of said cam being not less than the extent of movement of said clutch-actuating element, a rocking lever pivotally mounted on said clutch-actuating element and capable of engagement alternatively with said oppositely-movable members and thereby coupling said clutch-actuating element for movement with one or other of said oppositely movable members, and a cam follower mounted on said rocking lever and cooperating with said cam.

5. A preselective change-speed gearing having a gear-selecting element which is movable one side and the other of a neutral position to establish alternative drives through said gearing, a gear-changing control member, two members operatively connected together and to said control member in such a way as to be constrained to move simultaneously towards or away from each other, the said oppositely-movable two members being disposed one on each side of said gear-selecting element so as to be capable of moving the said element to the neutral position as a result of operation of said control member in one direction, a preselector control, a cam operatively connected with said preselector control, and a double-armed rocking lever mounted on said gear-selecting element and capable of rocking about an axis disposed transversely to the direction of motion of said oppositely movable members, the arms of said lever being each provided with a projection capable of engaging with said oppositely-movable members respectively, said cam cooperating with said rocking lever to determine the drive to be established as a result of movement of said gear-changing control member in the other direction.

6. Apparatus as claimed in claim 5 and comprising a compression spring device having a limited range of freedom, mounted on said double-armed lever and adapted to bear against said cam, and biasing means which urge said lever in such a direction as to maintain said spring device in contact with said cam.

7. A preselective change-speed gearing having a gear-changing control member, a slidable member operatively connected to said control member, a gear-selecting element, a lever pivotally connected at one point thereon to said slidable member and pivotally connected at a second point thereon to said gear-selecting element, a preselector control member, and means actuated by said preselector control member for positively locating at will a third point on said lever.

8. A preselective change-speed gearing having a gear-changing control member, a slidable member operatively connected to said control member, a gear-selecting element slidable in a path substantially parallel to the path of said slidable member, a lever pivotally connected at one end to said gear-selecting element and at a point intermediate of its ends to said slidable member, a preselector control member, means actuated by said preselector control member for engaging at will the other end of said lever and constraining said lever to rock about said other end, and automatic locking means comprising a spring detent and a stop cooperating therewith, said automatic locking means serving to effect engagement of said lever with said preselector control means.

9. A preselective change-speed gearing having a gear-selecting clutch of the friction type, a member for actuating said clutch, a gear-selecting clutch of the jaw type, a member for actuating said jaw clutch, said clutches being so arranged that power can be transmitted through them in series, and gear-changing means including a gear-changing control member, a disengageable connection between said control member and each of said clutch-actuating members, a preselector control for engaging and disengaging said connections, and means for preventing engagement of said friction clutch until said jaw clutch is engaged.

10. A preselective change-speed gearing having a gear-selecting clutch of the friction type, a member for actuating said clutch, a gear-selecting clutch of the jaw type associated with an auxiliary synchronizing clutch, a member for actuating said jaw and synchronizing clutch, said friction clutch and said jaw clutch being so arranged that power can be transmitted through them in series, and gear-changing means including a gear-changing control member, a disengageable connection between said control member and each of said clutch-actuating members, a preselector control for engaging and disengaging said connections, and means for maintaining said friction clutch disengaged while said synchronizing clutch is synchronizing said jaw clutch.

11. A preselective change-speed gearing having a driving shaft, two gear-selecting friction clutches drivably connected with said shaft, means for engaging said clutches alternatively, two gear-selecting jaw clutches, means for engaging said jaw clutches alternatively, gear trains of different ratios serving to connect each of said friction clutches to one of said jaw clutches, a driving connection between one of said friction clutches and the other of said jaw clutches, an output shaft drivably connected with said jaw clutches, and gear-changing means including a gear-changing control member, a disengageable connection between said control member and each of said clutch-engaging means, a preselector control for engaging and disengaging said connections, and means for preventing engagement of either of said friction clutches until one of said jaw clutches is engaged.

12. A preselective change-speed gearing comprising a gear-selecting clutch of the friction type, a member for actuating said clutch, a gear-selecting clutch of the jaw type, a member for actuating said clutch, a cam serving to control the movement of said jaw-clutch actuating member in both the engaging and the disengaging directions, said cam being so shaped that it can engage said jaw clutch during its initial displacement from one extreme position and during further displacement does not change the condition of said jaw clutch, and gear-changing control means including an operative connection between said cam and said friction-clutch actuating member, which serves to engage said friction clutch only during said further displacement of said cam.

13. A change-speed gearing having a rotary driving member, a rotary intermediate member, a rotary output member, two friction clutches each having a driving part and a driven part, said driving parts being both directly connected to said driving member and said driven parts being connected respectively by gear trains of different ratios with said intermediate member, two jaw clutches each having a driving part and a driven part, said jaw-clutch driven parts being both connected to said output member and said jaw-clutch driving parts being connected respectively to one of said friction clutch driven parts and to said intermediate member, means for actuating said friction clutches, means for actuating said jaw clutches, common gear-changing control mechanism operatively connected with said clutch-actuating means and comprising means for delaying engagement of either of said friction clutches until either of said jaw-clutches is engaged.

14. A preselective change-speed gearing having a rotary driving member, two coaxial input shafts, an output shaft aligned with said input shafts, a counter-shaft, two friction clutches connecting said input shafts respectively to said driving member and comprising a clutch-actuating element whereby said clutches can be alternatively engaged, at least three gear trains of different ratios, two of which are connected between said input shafts respectively and said counter-shaft and the third of which is connected between said counter-shaft and said output shaft, and includes a jaw clutch, a jaw clutch connected between one of said input shafts and said output shaft, said jaw clutches being provided with a clutch-actuating element whereby they can be alternatively engaged, gear-changing control means including disengageable connections with both of said clutch-actuating elements, and preselector control mechanism operatively associated with said connections, said control means being arranged to delay engagement of a friction clutch until either of said jaw clutches is engaged.

15. A change-speed gearing having a rotary driving member, a rotary intermediate member, a rotary output member, two friction clutches each having a driving part, and a driven part, said driving parts being both directly connected to said driving member and said driven parts being connected respectively by gear trains of different ratios with said intermediate member, said clutches having an actuating member whereby they can be engaged alternatively, two jaw clutches each having a driving part and a driven part, said jaw-clutch driven parts being both connected to said output member and said jaw-clutch driving parts being connected respectively to one of said friction clutch driven parts and to said intermediate member, said jaw clutches having an actuating member whereby they can be engaged alternatively, and control mechanism connected with said clutch-actuating members and capable of engaging either of said jaw clutches and thereafter either of said friction clutches.

16. A preselective change-speed gearing having two gear-selecting friction clutches, a clutch-actuating element movable one side and the other of a neutral position for alternatively engaging said clutches, two gear selecting jaw clutches, a clutch-actuating element movable one side and the other of a neutral position for alternatively engaging said jaw clutches, two members constrained to move simultaneously towards and away from each other and disposed one on each side of said friction-clutch actuating element, two members also constrained to move simultaneously towards and away from each other and disposed one on each side of said jaw clutch actuating element, a gear-changing control member, operative connections between said control member and said two pairs of oppositely-movable members, which connections serve, on continued movement of said control member in one sense to move said second-mentioned two oppositely-movable members away from each other, and thereafter to move said first-mentioned two oppositely-movable members away from each other, a preselector control and means actuated thereby for selectively connecting said oppositely-movable members to the said clutch-actuating elements associated therewith respectively.

17. In a change-speed gear mechanism having an output shaft, for a road motor vehicle, means for obtaining a reverse motion of the output shaft, including a counter-shaft, an axially slidable idler shaft, said shafts being parallel, a pinion journalled on said counter-shaft in constant mesh with a gear wheel mounted on said output shaft, a gear wheel slidable on but constrained to rotate with said counter-shaft and in constant mesh with a gear wheel fixed to said idler shaft, jaw-clutch teeth on said gear wheel, that is slidable on said counter-shaft, said teeth being engageable with jaw-clutch teeth on said pinion journalled on said counter-shaft, a pinion fixed to said idler shaft and capable of sliding into mesh with a gear wheel mounted on said output shaft, and control means capable of sliding said idler shaft, together with said slidable gear wheel on said counter-shaft, in one direction to engage said sliding mesh gear pair and in the other direction to engage said jaw clutch teeth.

REID ANTONY RAILTON.
ACHILLE CHARLES SAMPIETRO.